US009322366B2

(12) United States Patent
Pursifull

(10) Patent No.: US 9,322,366 B2
(45) Date of Patent: Apr. 26, 2016

(54) FUEL SYSTEM DIAGNOSTICS

(75) Inventor: Ross Dykstra Pursifull, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 323 days.

(21) Appl. No.: 13/604,290

(22) Filed: Sep. 5, 2012

(65) Prior Publication Data
US 2014/0060160 A1 Mar. 6, 2014

(51) Int. Cl.
G01M 3/28 (2006.01)
F02M 25/08 (2006.01)
G01M 15/09 (2006.01)

(52) U.S. Cl.
CPC ........... *F02M 25/0809* (2013.01); *G01M 15/09* (2013.01)

(58) Field of Classification Search
CPC .............. B60K 15/03504; B60K 2015/03514; F02D 41/003; F02M 25/0809; F02M 25/0818; F02M 25/0836; F02M 35/10229; F02M 37/04; Y02T 10/123
USPC ............... 73/114.38, 114.39, 114.42, 114.43; 123/518, 520, 521
See application file for complete search history.

(56) References Cited

U.S. PATENT DOCUMENTS

| 2,095,833 | A | * | 10/1937 | Rockwell ..................... 180/53.8 |
| 5,881,700 | A | * | 3/1999 | Gras et al. ..................... 123/520 |
| 5,890,474 | A | | 4/1999 | Schnaibel et al. |
| 7,073,376 | B2 | | 7/2006 | Hassdenteufel et al. |
| 7,107,759 | B2 | | 9/2006 | Annoura et al. |
| 7,255,093 | B2 | | 8/2007 | Iihoshi et al. |
| 2006/0191330 | A1 | * | 8/2006 | Hayakawa et al. .......... 73/118.1 |
| 2008/0034843 | A1 | * | 2/2008 | Streib et al. ...................... 73/40 |
| 2010/0114448 | A1 | * | 5/2010 | Gabor et al. .................... 701/79 |
| 2011/0166765 | A1 | * | 7/2011 | DeBastos et al. ............. 701/102 |
| 2011/0168140 | A1 | * | 7/2011 | DeBastos et al. ............. 123/521 |

OTHER PUBLICATIONS

Pursifull, Ross Dykstra, "Electrically Driven Vacuum Pump for a Vehicle," U.S. Appl. No. 13/429,178, filed Mar. 23, 2012, 27 pages.
Anonymous, "A Stuck Open FLVV Diagnostic and Mitigation for Gasoline Vehicles," IPCOM No. IPCOM000237701D, Published Jul. 3, 2014, 2 pages.
Anonymous, "A Carbon Canister Integrity Diagnostic for HEV Using ELCM Pump," IPCOM No. 000238913, Published Sep. 24, 2014, 2 pages.

* cited by examiner

Primary Examiner — Daniel S Larkin
Assistant Examiner — Irving A Campbell
(74) Attorney, Agent, or Firm — Julia Voutyras; Alleman Hall McCoy Russell & Tuttle LLP

(57) ABSTRACT

Methods and systems are provided for detecting a fuel system leak. While a system vacuum pump is operated to supply vacuum to a vacuum consumption device, air exhausted from the vacuum pump is routed to a fuel system to apply positive pressure thereon. A fuel system leak is identified based on a rate of decay of the pressure applied from the vacuum pump.

2 Claims, 3 Drawing Sheets

FUEL SYSTEM DIAGNOSTICS

FIELD

The present description relates to systems and methods for identifying fuel system leaks in a vehicle, such as a hybrid vehicle.

BACKGROUND AND SUMMARY

Vehicles may be fitted with evaporative emission control systems to reduce the release of fuel vapors to the atmosphere. For example, vaporized hydrocarbons (HCs) from a fuel tank may be stored in a fuel vapor canister packed with an adsorbent which adsorbs and stores the vapors. At a later time, when the engine is in operation, the evaporative emission control system allows the vapors to be purged into the engine intake manifold for use as fuel. However, leaks in the emissions control system can inadvertently allow fuel vapors to escape to the atmosphere. Thus, various approaches are used to identify such leaks.

One example approach for leak detection is shown by Annoura et al. in U.S. Pat. No. 7,107,759. Therein, a brake booster vacuum pump is used during engine-off conditions to apply a vacuum on the fuel system. Fuel system leaks are then identified based on a rate of decay of the applied vacuum. This allows the same vacuum pump to be used for brake booster application as well as leak detection.

However, the inventors herein have identified potential issues with such an approach. As one example, to perform the leak detection routine, the vacuum pump has to be operated, consuming vehicle power and reducing fuel economy. As another example, some leaks may be masked in the presence of negative pressure. If the leak goes undetected, exhaust emissions may be degraded.

Thus, in one example, some of the above issues may be addressed by a method for a vehicle fuel system, comprising: indicating fuel system degradation in response to a change in fuel system pressure following application of a positive pressure generated at an electrically-driven vacuum pump. In this way, air exhausted from a vacuum pump during pump operation can be applied to the fuel system for leak detection.

In one example, an engine system may include a vacuum pump configured to supply vacuum to a vacuum consumption device (e.g., a vehicle brake booster). The vacuum pump may be coupled to a fuel system such that during conditions when the vacuum pump is operated to supply vacuum to the vacuum consumption device, air exhausted from the pump can be directed to the fuel system. For example, the exhausted air can be applied on a fuel system canister to pressurize a fuel tank. Following application of the positive pressure, a rate of pressure decay may be monitored. In response to the rate of pressure decay being higher than a threshold rate, a fuel system leak may be determined. The vacuum pump may also be operated to apply a vacuum on the fuel system so that each of a positive pressure and a negative pressure leak test can be sequentially performed. Following application of the negative pressure, a rate of vacuum decay may be monitored and a fuel system leak may be determined if the rate of vacuum decay is higher than a threshold rate.

In this way, vacuum pump operation can be synergistically coupled to a positive pressure fuel system leak test. By allowing positive pressure from the vacuum pump to be used for a fuel system leak test while a vacuum pump is already operating to provide vacuum to a vacuum-operated actuator, the electrically driven vacuum pump may be operated less frequently. By reducing the frequency of pump operation, an operational lifespan of the electrically driven vacuum pump may be increased. In addition, since fuel vapor does not pass through the pump, issues related to material incompatibility may not arise. By using the vacuum pump to also perform a negative pressure leak test, leaks masked by a positive pressure leak test may be identified during the negative pressure leak test, and vice versa, improving leak detection accuracy. By using the same pump for each of a positive pressure and negative pressure leak test, as well as for vacuum generation for other engine actuators, component reduction benefits are achieved.

It will be understood that the summary above is provided to introduce in simplified form a selection of concepts that are further described in the detailed description, which follows. It is not meant to identify key or essential features of the claimed subject matter, the scope of which is defined by the claims that follow the detailed description. Further, the claimed subject matter is not limited to implementations that solve any disadvantages noted above or in any part of this disclosure.

BRIEF DESCRIPTION OF THE DRAWINGS

The subject matter of the present disclosure will be better understood from reading the following detailed description of non-limiting embodiments, with reference to the attached drawings, wherein.

DETAILED DESCRIPTION

Figure 1:
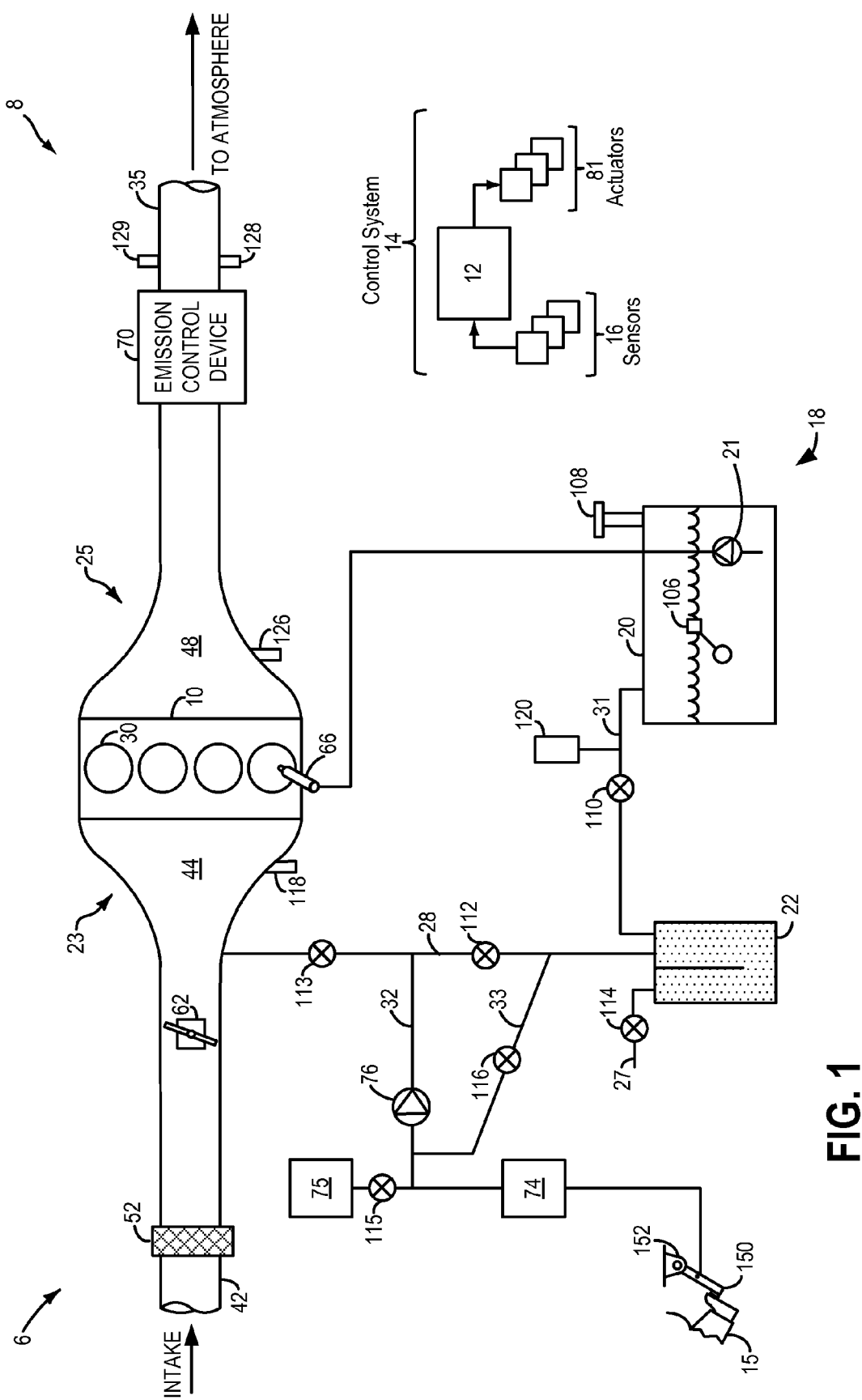
FIG. 1 shows a schematic depiction of a vehicle including an engine, a fuel system, and an electrically driven vacuum pump.

Methods and systems are provided for identifying leaks in a fuel system coupled to an engine, such as the fuel system of FIG. 1. A positive pressure leak test may be opportunistically performed during actuation of a vacuum pump using air exhausted from the vacuum pump. A negative pressure leak test may be performed using engine intake vacuum or vacuum from the vacuum pump. A controller may be configured to perform a control routine, such as the example routine of FIG. 2, to route air exhausted from the vacuum pump, during conditions when the pump is actuated to provide vacuum to a vacuum consumption device of the engine system, so as to pressurize the fuel system. A fuel system leak may then be determined based on a rate of subsequent pressure decay. The controller may alternatively route vacuum from a running engine, or the vacuum pump, to a fuel system canister to apply a vacuum on the fuel system. A fuel system leak may then be determined based on a rate of subsequent vacuum decay. Example leak tests are described at FIG. 3. In this way, fuel system leaks may be identified while reducing a frequency of vacuum pump operation.

FIG. 1 shows a schematic depiction of a hybrid vehicle system 6 that can derive propulsion power from engine system 8 and/or an on-board energy storage device (not shown), such as a battery system. An energy conversion device, such as a generator (not shown), may be operated to absorb energy from vehicle motion and/or engine operation, and then convert the absorbed energy to an energy form suitable for storage by the energy storage device.

Engine system 8 may include an engine 10 having a plurality of cylinders 30. Engine 10 includes an engine intake 23 and an engine exhaust 25. Engine intake 23 includes an air intake throttle 62 fluidly coupled to the engine intake manifold 44 via an intake passage 42. Air may enter intake passage 42 via air filter 52. Engine exhaust 25 includes an exhaust manifold 48 leading to an exhaust passage 35 that routes exhaust gas to the atmosphere. Engine exhaust 25 may include one or more emission control devices 70 mounted in a close-coupled position. The one or more emission control devices may include a three-way catalyst, lean NOx trap, diesel particulate filter, oxidation catalyst, etc. It will be appreciated that other components may be included in the engine such as a variety of valves and sensors, as further elaborated in herein. In some embodiments, wherein engine system 8 is a boosted engine system, the engine system may further include a boosting device, such as a turbocharger (not shown).

Engine system 8 is coupled to a fuel system 18. Fuel system 18 includes a fuel tank 20 coupled to a fuel pump 21 and a fuel vapor canister 22. During a fuel tank refueling event, fuel may be pumped into the vehicle from an external source through refueling door 108. Fuel tank 20 may hold a plurality of fuel blends, including fuel with a range of alcohol concentrations, such as various gasoline-ethanol blends, including E10, E85, gasoline, etc., and combinations thereof. A fuel level sensor 106 located in fuel tank 20 may provide an indication of the fuel level ("Fuel Level Input") to controller 12. As depicted, fuel level sensor 106 may comprise a float connected to a variable resistor. Alternatively, other types of fuel level sensors may be used.

Fuel pump 21 is configured to pressurize fuel delivered to the injectors of engine 10, such as example injector 66. While only a single injector 66 is shown, additional injectors are provided for each cylinder. It will be appreciated that fuel system 18 may be a return-less fuel system, a return fuel system, or various other types of fuel system. Vapors generated in fuel tank 20 may be routed to fuel vapor canister 22, via conduit 31, before being purged to the engine intake 23.

Fuel vapor canister 22 is filled with an appropriate adsorbent for temporarily trapping fuel vapors (including vaporized hydrocarbons) generated during fuel tank refueling operations, as well as diurnal vapors. In one example, the adsorbent used is activated charcoal. When purging conditions are met, such as when the canister is saturated, vapors stored in fuel vapor canister 22 may be purged to engine intake 23 by opening canister purge valve 112. While a single canister 22 is shown, it will be appreciated that fuel system 18 may include any number of canisters.

Canister 22 includes a vent 27 for routing gases out of the canister 22 to the atmosphere when storing, or trapping, fuel vapors from fuel tank 20. Vent 27 may also allow fresh air to be drawn into fuel vapor canister 22 when purging stored fuel vapors to engine intake 23 via purge line 28 and purge valve 112. While this example shows vent 27 communicating with fresh, unheated air, various modifications may also be used. Vent 27 may include a canister vent valve 114 to adjust a flow of air and vapors between canister 22 and the atmosphere. The canister vent valve may also be used for diagnostic routines. When included, the vent valve may be opened during fuel vapor storing operations (for example, during fuel tank refueling and while the engine is not running) so that air, stripped of fuel vapor after having passed through the canister, can be pushed out to the atmosphere. Likewise, during purging operations (for example, during canister regeneration and while the engine is running), the vent valve may be opened to allow a flow of fresh air to strip the fuel vapors stored in the canister.

As such, hybrid vehicle system 6 may have reduced engine operation times due to the vehicle being powered by engine system 8 during some conditions, and by the energy storage device under other conditions. While the reduced engine operation times reduce overall carbon emissions from the vehicle, they may also lead to insufficient purging of fuel vapors from the vehicle's emission control system. To address this, a fuel tank isolation valve 110 may be optionally included in conduit 31 such that fuel tank 20 is coupled to canister 22 via the valve. During regular engine operation, isolation valve 110 may be kept closed to limit the amount of diurnal or "running loss" vapors directed to canister 22 from fuel tank 20. During refueling operations, and selected purging conditions, isolation valve 110 may be temporarily opened, e.g., for a duration, to direct fuel vapors from the fuel tank 20 to canister 22. By opening the valve during purging conditions when the fuel tank pressure is higher than a threshold (e.g., above a mechanical pressure limit of the fuel tank above which the fuel tank and other fuel system components may incur mechanical damage), the refueling vapors may be released into the canister and the fuel tank pressure may be maintained below pressure limits. While the depicted example shows isolation valve 110 positioned along conduit 31, in alternate embodiments, the isolation valve may be mounted on fuel tank 20.

One or more pressure sensors 120 may be coupled to fuel system 18 for providing an estimate of a fuel system pressure. In one example, the fuel system pressure is a fuel tank pressure, wherein pressure sensor 120 is a fuel tank pressure sensor coupled to fuel tank 20 for estimating a fuel tank pressure or vacuum level. While the depicted example shows pressure sensor 120 coupled between the fuel tank and canister 22, specifically between the fuel tank and isolation valve 110, in alternate embodiments, the pressure sensor may be directly coupled to fuel tank 20. In still other embodiments, a first pressure sensor may be positioned upstream of the isolation valve (between the isolation valve and the canister) while a second pressure sensor is positioned downstream of the isolation valve (between the isolation valve and the fuel tank), to provide an estimate of a pressure difference across the valve.

Fuel vapors released from canister 22, for example during a purging operation, may be directed into engine intake manifold 44 via purge line 28. The flow of vapors along purge line 28 may be regulated by canister purge valve 112, coupled between the fuel vapor canister and the engine intake. The quantity and rate of vapors released by the canister purge valve may be determined by the duty cycle of an associated canister purge valve solenoid (not shown). As such, the duty cycle of the canister purge valve solenoid may be determined by the vehicle's powertrain control module (PCM), such as controller 12, responsive to engine operating conditions, including, for example, engine speed-load conditions, an air-fuel ratio, a canister load, etc. By commanding the canister purge valve to be closed, the controller may seal the fuel vapor recovery system from the engine intake. An optional canister check valve (not shown) may be included in purge line 28 to prevent intake manifold pressure from flowing gases in the opposite direction of the purge flow. As such, the check valve may be necessary if the canister purge valve control is not accurately timed or the canister purge valve itself can be forced open by a high intake manifold pressure. An estimate of the manifold absolute pressure (MAP) or manifold vacuum (ManVac) may be obtained from MAP sensor 118 coupled to intake manifold 44, and communicated with controller 12. Alternatively, MAP may be inferred from alternate engine operating conditions, such as mass air flow (MAF), as measured by a MAF sensor (not shown) coupled to the intake manifold.

Fuel system 18 may be operated by controller 12 in a plurality of modes by selective adjustment of the various valves and solenoids. For example, the fuel system may be operated in a fuel vapor storage mode (e.g., during a fuel tank refueling operation and with the engine not running), wherein the controller 12 may open isolation valve 110 while closing canister purge valve (CPV) 112 to direct refueling vapors into canister 22 while preventing fuel vapors from being directed into the intake manifold.

As another example, the fuel system may be operated in a refueling mode (e.g., when fuel tank refueling is requested by a vehicle operator), wherein the controller 12 may open isolation valve 110, while maintaining canister purge valve 112 closed, to depressurize the fuel tank before allowing enabling fuel to be added therein. As such, isolation valve 110 may be kept open during the refueling operation to allow refueling vapors to be stored in the canister. After refueling is completed, the isolation valve may be closed.

As yet another example, the fuel system may be operated in a canister purging mode (e.g., after an emission control device light-off temperature has been attained and with the engine running), wherein the controller 12 may open canister purge valve 112 while closing isolation valve 110. Herein, the vacuum generated by the intake manifold of the operating engine may be used to draw fresh air through vent 27 and through fuel vapor canister 22 to purge the stored fuel vapors into intake manifold 44. In this mode, the purged fuel vapors from the canister are combusted in the engine. The purging may be continued until the stored fuel vapor amount in the canister is below a threshold. During purging, the learned vapor amount/concentration can be used to determine the amount of fuel vapors stored in the canister, and then during a later portion of the purging operation (when the canister is sufficiently purged or empty), the learned vapor amount/concentration can be used to estimate a loading state of the fuel vapor canister. For example, one or more oxygen sensors (not shown) may be coupled to the canister 22 (e.g., downstream of the canister), or positioned in the engine intake and/or engine exhaust, to provide an estimate of a canister load (that is, an amount of fuel vapors stored in the canister). Based on the canister load, and further based on engine operating conditions, such as engine speed-load conditions, a purge flow rate may be determined.

Controller 12 may also be configured to intermittently perform leak detection routines on fuel system 18 to confirm that the fuel system is not degraded. As such, leak detection routines may be performed while the vehicle is running with the engine on (e.g., during an engine mode of hybrid vehicle operation) or with the engine off (e.g., during a battery mode of hybrid vehicle operation). Leak tests performed while the engine is off may include applying a positive pressure on the fuel system for a duration (e.g., until a target fuel tank pressure is reached) and then sealing the fuel system while monitoring a change in fuel tank pressure (e.g., a rate of change in the pressure, or a final pressure value). Leak tests performed while the engine is off may also include applying a negative pressure on the fuel system for a duration (e.g., until a target fuel tank vacuum is reached) and then sealing the fuel system while monitoring a change in fuel tank pressure (e.g., a rate of change in the vacuum level, or a final pressure value). By performing both positive pressure and negative pressure leak tests, small leaks may be better identified since leaks masked by the application of positive pressure may be identified in the negative pressure leak test while leaks masked by the application of negative pressure may be identified in the positive pressure leak test.

Engine system 8 further includes one or more vacuum consumption devices 74, 75. An electrically-driven vacuum pump 76 is coupled to vacuum consumption devices 74, 75 and is configured to provide vacuum for operating or actuating the vacuum consumption devices. In the depicted example, vacuum pump 76 is electrically-driven using power from energy storage device. In one example, vacuum consumption device 74 may be a brake booster wherein vacuum pump 76 is actuated responsive to vehicle brake application. For example, the brake booster may include an internal vacuum reservoir that amplifies a force provided by a vehicle operator 15 via a brake pedal 150 for applying vehicle brakes (not shown). A position of the brake pedal 150 may be monitored by a brake pedal sensor 152. Electrically driven vacuum pump 76 may be selectively operated via a control signal from the controller 12 to supply at least some vacuum to the brake booster. Vacuum consumption device 75 may be an alternate vacuum consumer, such as a speed control actuator or HVAC system doors.

The inventors herein have recognized that during conditions when the vacuum pump 76 is actuated for providing vacuum to the vacuum consumption device 74, air exhausted from the vacuum pump can be opportunistically applied on canister 22 to pressurize fuel system 18. Specifically, the vacuum pump may be operated and while routing vacuum from a first outlet of the pump to the vacuum consumption device, air exhausted from a second, different outlet of the pump may be routed to canister 22 of fuel system 18. This enables application of a positive pressure, generated at the electrically-driven vacuum pump, on the fuel system. By allowing a positive pressure leak test to be advantageously performed while the vacuum pump is being operated, synergistic benefits are provided. As such, if leak test conditions are not met, the air exhausted from the vacuum pump may be directed to intake manifold 44 along purge line 28 by opening solenoid valve 113 and closing canister purge valve 112. During other conditions, such as when a negative pressure leak test is to be performed, the vacuum pump may be operated to route vacuum from the first outlet of the pump to the canister 22 of fuel system 18. Therein, fuel system degradation is indicated in response to a change in fuel system pressure following application of a negative pressure generated at the electrically-driven vacuum pump.

In one example, each of the leak tests may be performed sequentially, an order of the leak tests based on opportunity. For example, if vacuum pump 76 is already actuated and supplying vacuum to vacuum consumption device 74 when leak test conditions are met, the positive pressure leak test may be performed before the negative pressure leak test by pressurizing the fuel system with air exhausted from the vacuum pump. As another example, if the vacuum pump 76 is already actuated and done (or almost done) supplying vacuum to vacuum consumption device 74 when leak test conditions are met, the negative pressure leak test may be performed before the positive pressure leak test by applying vacuum from the vacuum pump to the fuel system.

To perform the positive pressure leak test during engine-off conditions, air exhausted from the operation of vacuum pump 76 is applied on the fuel system. Specifically, the exhausted air is applied along conduit 32 onto canister 22 while opening canister purge valve 112. A solenoid valve 113 positioned along purge line 28 is kept closed to isolate the intake manifold from the air exhausted by the vacuum pump. In addition, a solenoid valve 116 coupling a first outlet of the vacuum pump to the fuel system along conduit 33 is kept closed to isolate the fuel system from vacuum generated at the fuel pump. As such, if the vacuum consumption device (e.g., the brake booster) contains insufficient air, air may need to be let into the vacuum pump via a solenoid valve. For example, once the brake booster is evacuated, solenoid valve 115 may be opened so that air may be let into the first inlet of the vacuum pump from vacuum consumption device 75. This allows a positive pressure from the vacuum pump to continue to be applied on the fuel system. In some embodiments, conduit 32 may include a regulator (not shown) for regulating a pressure of the exhausted air applied to fuel tank 20, as well as a check valve (not shown) to prevent fuel vapors from the canister from flowing in the reverse direction. During the positive pressure leak test, canister purge valve 112 and isolation valve 110 are kept open to allow the positive pressure from the vacuum pump 76 to be applied on the fuel tank 20 via the canister 22 along conduits 32 and 31. Additionally, a canister vent solenoid of canister vent valve 114, and solenoid 116 along conduit 33 are kept closed. Then, after a threshold fuel tank positive pressure has been reached, the isolation valve may be closed while a fuel tank pressure bleed-down is monitored at pressure sensor 120. Based on the bleed-down rate and a final stabilized fuel tank pressure following the application of the positive pressure, the presence of a fuel system leak may be determined. For example, in response to a bleed-down rate that is faster than a threshold rate, a leak may be determined and fuel system degradation may be indicated.

To perform the negative pressure leak test during engine-off conditions, an engine-off natural vacuum (EONV) may be applied of the fuel tank. Therein, the fuel system may be sealed during an engine-off event (e.g., at a key-off event) by closing the canister vent valve. As such, during engine running, heat is rejected from the engine to the fuel tank, causing a rise in fuel tank temperature and pressure. Then, during the engine-off condition, as the fuel tank cools to ambient temperature conditions, a pressure in the fuel tank may drop (due to the relation between temperature and pressure of an ideal gas), allowing a vacuum (the "engine-off natural vacuum") to be applied on the fuel tank. Based on a subsequent rate of vacuum bleed-up, fuel system leaks may be identified.

Alternatively, to perform the negative pressure leak test during engine-off conditions, negative pressure generated at vacuum pump 76 may be applied on the fuel system. Specifically, solenoid valve 116 may be opened so that vacuum may be drawn from the first outlet of vacuum pump 76 along conduit 33 and applied on the fuel system. During the engine-off negative pressure leak test with vacuum applied from the vacuum pump, canister purge valve 112 is kept closed and isolation valve 110 is kept open to allow the negative pressure from the vacuum pump to be applied on the fuel tank 20 via the canister 22. At the same time, solenoid valve 113 may be kept open so that air exhausted from vacuum pump 76 can be directed to intake manifold 44. Additionally, a canister vent solenoid of canister vent valve 114 is kept closed. Then, after a threshold fuel tank negative pressure has been reached, the isolation valve may be closed while a fuel tank pressure bleed-up is monitored at pressure sensor 120. Based on the pressure bleed-up rate (or vacuum decay rate) and the final stabilized fuel tank pressure following the application of the negative pressure, the presence of a fuel system leak may be determined. For example, in response to a vacuum decay rate that is faster than a threshold rate, a leak may be determined and fuel system degradation may be indicated. In this way, each of the positive pressure leak test and the negative pressure leak test may be opportunistically performed, reducing the need for operating vacuum pump 76 for the sole purpose of performing a leak test.

It will be appreciated that while the depicted example shows solenoid valves 112 and 113 coupled along purge line 28, between intake manifold 44 and canister 22, as distinct valves, in alternate embodiments, the valves may be combined. In still further embodiments, a diverter valve may be positioned at the intersection of conduit 32 and purge line 28 to direct air exhausted from the vacuum pump to either the fuel system (when positive pressure leak test conditions are met during vacuum pump operation) or the intake manifold (when positive pressure leak test conditions are not met during vacuum pump operation).

In an alternate example, if the engine is already operating with natural aspiration of air when leak test conditions are met, the negative pressure leak test may be performed before the positive pressure leak test by applying vacuum from the running engine to the fuel system. Herein, the positive pressure leak test may be opportunistically performed during engine-off conditions when the vacuum pump is operating, while the negative pressure leak test may be opportunistically performed during engine-on conditions when the engine is naturally aspirated.

While FIG. 1 shows vacuum pump 76 coupled to the fuel system along conduit 32 without an intervening valve, it will be appreciated that in alternate embodiments, one or more valves may be coupled along conduit 32, between vacuum pump 76 and canister 22 to allow selectively coupling of the pump the fuel system. Further, one or more valves (e.g., a three-way valve) may be coupled to vacuum pump 76 to enable a first (vacuum) outlet of the pump to be selectively coupled to either vacuum consumption device 74 or canister 22, and likewise enables a second (exhausted air) outlet of the pump to be selectively coupled to either canister 22 or the atmosphere.

It will be appreciated that the fuel system may be operated in various purging modes based on whether a canister purging operation occurred after pressure was applied for leak testing, and further based on the nature of the applied pressure. For example, the controller may operate the fuel system in a first purging mode if a purging operation occurs immediately after a positive pressure was applied for a positive pressure leak test. Herein, the controller may increase the duration of the purging to compensate for fuel vapors that may have been pushed out of the canister into the fuel tank during the leak test. As another example, the controller may operate the fuel system in a second purging mode if a purging operation occurs immediately after a negative pressure was applied for a negative pressure leak test. Herein, the controller may decrease the duration of the purging to compensate for fuel vapors that may have been purged from the canister to the engine intake during the leak test. If neither positive nor negative pressure was applied to the fuel tank immediately before the purging, the controller may operate the fuel system in a third (e.g., default) purging mode wherein the purge flow rate and duration is based on the canister load and engine operating conditions.

Returning to FIG. 1, vehicle system 6 may further include control system 14. Control system 14 is shown receiving information from a plurality of sensors 16 (various examples of which are described herein) and sending control signals to a plurality of actuators 81 (various examples of which are described herein). As one example, sensors 16 may include exhaust gas sensor 126 located upstream of the emission control device, temperature sensor 128, MAP sensor 118, and pressure sensor 129. As another example, in embodiments where vacuum consumption device 74 is a brake booster, sensors 16 may include sensor 152 coupled to brake pedal 150. In some embodiments, a sensor may be coupled to vacuum consumption device 74 for sensing actuation of the device, and/or a vacuum level of the device. Other sensors such as additional pressure, temperature, air/fuel ratio, and composition sensors may be coupled to various locations in the vehicle system 6. As another example, the actuators may include fuel injector 66, isolation valve 110, purge valve 112, vent valve 114, vacuum pump 76, vacuum consumption device 74, and throttle 62. The control system 14 may include a controller 12. The controller may receive input data from the various sensors, process the input data, and trigger the actuators in response to the processed input data based on instruction or code programmed therein corresponding to one or more routines. An example control routine is described herein with regard to FIG. 2.

In this way, the system of FIG. 1 enables a method for indicating fuel system degradation in response to a change in fuel system pressure following application of a positive pressure generated at an electrically-driven vacuum pump. Specifically, each of a positive and a negative pressure are applied to a fuel tank of the fuel system through a canister via use of the same vacuum pump.

Figure 2:
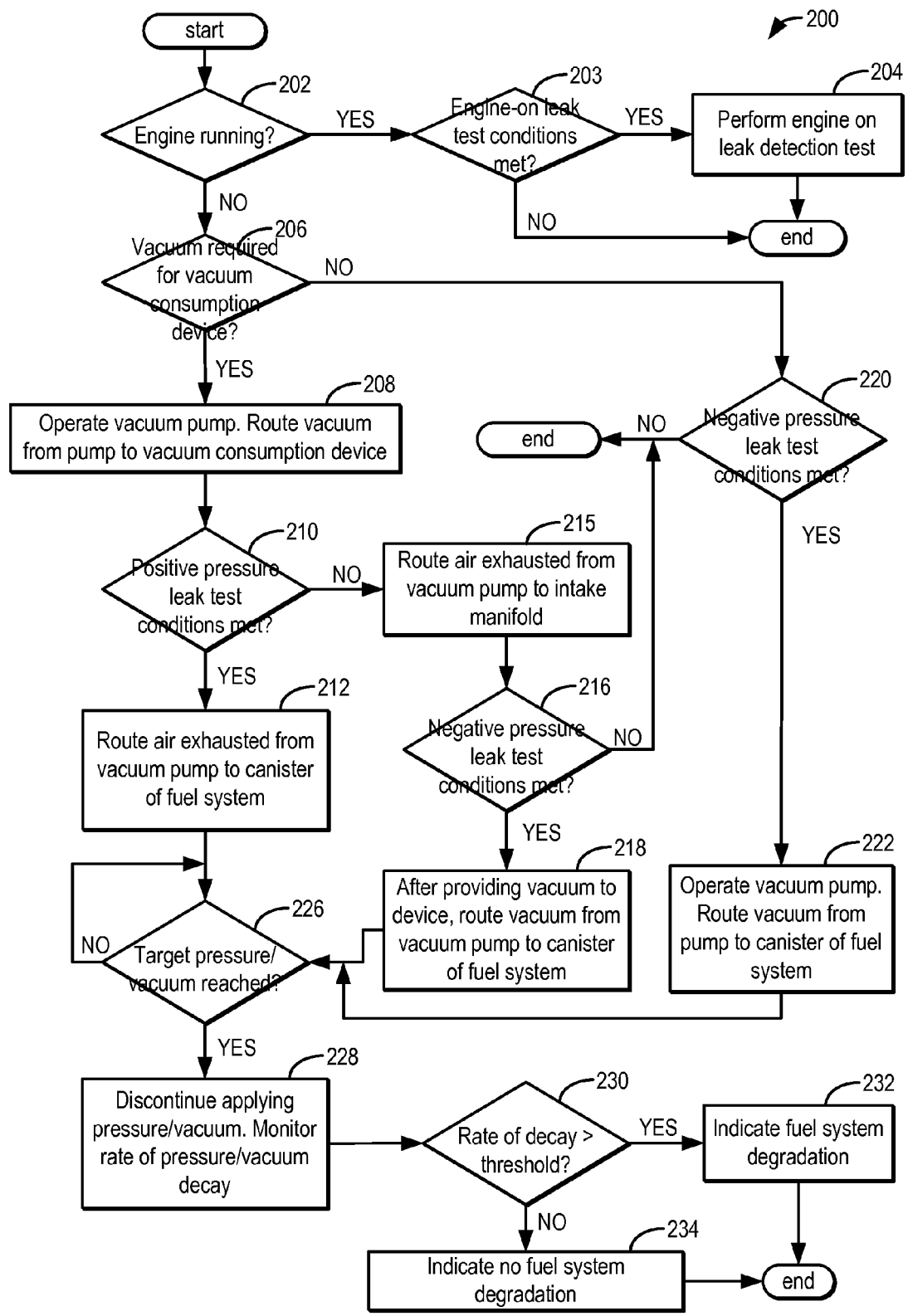
FIG. 2 shows a high level flow chart illustrating a routine that may be implemented for supplying positive or negative pressure from the vacuum pump to the fuel system for a leak test.

Now turning to FIG. 2, an example routine 200 is shown for sequentially applying positive and negative pressure on a fuel system and identifying a fuel system leak based on a change in fuel system pressure following the application of the positive or negative pressure.

At 202, it may be determined if the engine is running. In one example, the engine may be running if the hybrid vehicle is operating in an engine mode wherein the vehicle is being propelled by the engine. If the engine is running, then at 203, it may be determined if engine-on leak test conditions have been met. In one example, engine-on leak test conditions may be considered met if a threshold duration has elapsed since a last leak test. Upon confirming leak conditions being met, at 204, an engine-on leak detection test may be performed. Therein, canister purge valve 112 and solenoid valve 113 may be opened (while solenoid valve 116 is maintained closed) so that vacuum generated at intake manifold 44 can be applied to fuel tank 20 via canister 22. The manifold vacuum may be applied until a target fuel tank pressure is reached. Then, the canister purge valve may be closed to seal the system and a rate of decay in vacuum may be monitored. If the rate of decay is higher than a threshold rate, a system leak may be determined. Else, if the rate of decay is lower than the threshold rate, no system leak is determined.

If the engine is not running, for example, if the vehicle is in a battery mode of operation wherein the vehicle is being propelled by the battery, then at 206, it may be determined if vacuum is required for a vacuum consumption device. In other words, it may be determined if the electrically-driven vacuum pump needs to be actuated for providing vacuum to the vacuum consumption device. In one example, where the vacuum consumption device is a brake booster, the electrically-driven vacuum pump may be actuated responsive to vehicle brake application.

If vacuum is required, then at 208, the routine includes actuating the vacuum pump to generate vacuum for operating the device. In particular, vacuum may be routed from a first outlet of the vacuum pump to the vacuum consumption device. Next at 210, it may be determined if positive pressure leak test conditions have been met. In one example, positive pressure leak test conditions may be considered met if a threshold duration has elapsed since a last positive pressure leak test. As another example, positive pressure leak test conditions may be considered met if the last leak test performed was a negative pressure leak test.

If positive pressure leak test conditions are confirmed, then at 212, while operating the vacuum pump to apply vacuum to the vacuum consumption device, air exhausted from the electrically-driven vacuum pump may be routed to the fuel system. Specifically, air exhausted from a second, different outlet of the vacuum pump may be routed to the fuel system, and applied on the fuel tank via the canister so as to pressurize the fuel system. In this way, a positive pressure generated at the electrically-driven vacuum pump may be applied on the fuel system and used to indicate fuel system degradation. To route the exhaust from the vacuum pump to the fuel system, a canister purge valve may be opened while a solenoid valve coupling the vacuum pump exhaust to the intake manifold (the solenoid valve positioned in a purge line between the canister purge valve and the intake manifold) may be closed. In addition, a solenoid valve coupling the first outlet of the vacuum pump to the fuel system may be closed. In one example, the positive pressure from the vacuum pump may be applied for a duration until a target fuel tank pressure is achieved. Accordingly, at 226, it may be determined if the target pressure has been reached. If the target pressure has not been reached, the positive pressure may continue to be applied until the target pressure is reached. Once the target pressure has been reached, at 228, application of positive pressure may be discontinued. This may include deactivating the electrically-driven pump and closing the canister purge valve and a canister vent valve. Additionally, at 228, the fuel system pressure may be monitored. In one example, the fuel system pressure is a fuel tank pressure estimated by a pressure sensor coupled between the fuel tank and the canister of the fuel system. Monitoring the fuel system pressure may include monitoring a rate of change in the fuel tank pressure and/or monitoring a stabilized fuel tank pressure following the application of the positive pressure.

As such, following isolation of the fuel system, the fuel system pressure (herein, the fuel tank pressure) may be expected to equilibrate back (herein, bleed-down) towards atmospheric pressure at a defined rate (based on a reference orifice size). If a leak is present, the monitored fuel tank pressure may be expected to bleed-down to the atmospheric pressure at a faster rate.

Accordingly, at 230, a rate of change in the fuel tank pressure following application of the positive pressure may be determined and compared to a threshold rate. If the rate of fuel system pressure decay is larger than the threshold rate, (that is, if following application of the positive pressure, the rate of change in fuel tank pressure is faster than the threshold rate), then at 232, fuel system degradation may be determined. As used herein, the rate of change may be an absolute rate of change in the fuel tank (positive) pressure. Fuel system degradation may be indicated by setting a diagnostic code (e.g., by setting a malfunction indication light). An orifice size of the leak may be determined based on a difference between the absolute rate of change in the fuel system pressure and the threshold rate. Specifically, as the difference increases, a larger orifice size of the leak may be indicated. In comparison, if the rate of fuel system pressure decay is smaller than the threshold rate (that is, if following application of the positive pressure, the rate of change in fuel tank pressure is slower than the threshold rate), no fuel system degradation (based on the positive pressure leak test) may be determined.

Returning to 210, if positive pressure leak test conditions are not met, then at 215, while operating the vacuum pump to apply vacuum to the vacuum consumption device, air exhausted from the electrically-driven vacuum pump may be routed to the intake manifold. To route the exhaust from the vacuum pump to the intake manifold, the canister purge valve may be closed while the solenoid valve coupling the vacuum pump exhaust to the intake manifold may be opened. In addition, a solenoid valve coupling the first outlet of the vacuum pump to the fuel system may be closed. Next, at 216, it may be determined if negative pressure leak test conditions have been met. In one example, negative pressure leak test conditions may be considered met if a threshold duration has elapsed since a last negative pressure leak test. As another example, negative pressure leak test conditions may be considered met if the last leak test performed was a positive pressure leak test. If negative pressure conditions are not met, the routine may end.

If negative pressure leak test conditions are confirmed, then at 218, after providing vacuum to the vacuum consumption device, the vacuum pump may continue to be operated to apply vacuum to the fuel system. Specifically, after routing vacuum from the first outlet of the vacuum pump to the vacuum consumption device, vacuum may be routed from the first outlet of the vacuum pump to the fuel system, and applied on the fuel tank via the canister so as to (negative) pressurize the fuel system. To do this, the canister purge valve may be closed and the solenoid valve coupling the first outlet of the vacuum pump to the fuel system may be opened. In addition, the solenoid valve coupling the second outlet of the vacuum pump to the intake manifold may be opened so that air exhausted during operation of the vacuum pump can be exhausted to the intake manifold. In this way, a negative pressure generated at the electrically-driven vacuum pump may be applied on the fuel system and used to indicate fuel system degradation.

Returning to 206, if vacuum is not required for the vacuum consumption device, the routine proceeds to 220 to determine if negative pressure leak test conditions have been met. If negative pressure leak test conditions are confirmed, then at 222, the routine includes actuating the electrically-driven vacuum pump to generate vacuum and route the generated vacuum from the first outlet of the vacuum pump to the fuel system fuel tank via the canister. As previously elaborated, this includes closing the canister purge valve while opening the solenoid valve coupling the second outlet of the vacuum pump to the intake manifold (so that air can be exhausted from the vacuum pump into the intake manifold) and the solenoid valve coupling the first outlet of the vacuum pump to the fuel system (so that vacuum from the pump can be applied on the fuel system). From either 218 or 222, while negative pressure is generated at the vacuum pump and applied on the fuel system, the routine proceeds to 226.

In one example, during the negative pressure leak test performed with the vacuum pump running at 218 and 222, the negative pressure from the vacuum pump may be applied for a duration until a target fuel tank vacuum is achieved. As previously elaborated with reference to the positive pressure leak test, at 226, it may be determined if a target pressure (e.g., a target vacuum level) has been reached. If the target pressure (e.g., target vacuum) has not been reached, the negative pressure may continue to be applied until the target pressure (e.g., target vacuum) is reached. Once the target pressure has been reached, at 228, application of negative pressure may be discontinued. This may include deactivating the electrically-driven pump, and closing the solenoid valve coupling the first outlet of the vacuum pump to the fuel system, while maintaining the canister purge valve closed. Additionally, at 228, the fuel system pressure may be monitored including monitoring a rate of change in the fuel tank pressure and/or monitoring a stabilized fuel tank pressure following the application of the negative pressure.

As such, following isolation of the fuel system, the fuel system pressure (herein, the fuel tank pressure) may be expected to equilibrate back (herein, bleed-up) towards atmospheric pressure at a defined rate (based on a reference orifice size). If a leak is present, the monitored fuel tank pressure may be expected to bleed-up to the atmospheric pressure at a faster rate.

Accordingly, at 230, a rate of change in the fuel tank pressure following application of the negative pressure may be determined and compared to a threshold rate. If the rate of fuel system vacuum decay is larger than the threshold rate, (that is, if following application of the negative pressure, the rate of change in fuel tank pressure is faster than the threshold rate), then at 232, fuel system degradation may be determined. As used herein, the rate of change may be an absolute rate of change in the fuel tank (negative) pressure. Fuel system degradation may be indicated by setting a diagnostic code (e.g., by setting a malfunction indication light). An orifice size of the leak may be determined based on a difference between the absolute rate of change in the fuel system pressure and the threshold rate. Specifically, as the difference increases, a larger orifice size of the leak may be indicated. In comparison, if the rate of fuel system vacuum decay is smaller than the threshold rate (that is, if following application of the negative pressure, the rate of change in fuel tank pressure is slower than the threshold rate), no fuel system degradation (based on the negative pressure leak test) may be determined.

As such, there may be conditions where even though a leak is present, the presence of positive pressure or negative pressure can mask the leak. Thus, in some embodiments, even if fuel system degradation is not determined following the positive pressure leak test, the routine may proceed to confirm the presence of no leaks by performing a negative pressure leak test. Likewise, even if fuel system degradation is not determined following the negative pressure leak test, the routine may proceed to confirm the presence of no leaks by performing a positive pressure leak test.

In some embodiments, an order of sequentially performing the positive and negative pressure leak tests may be predetermined. For example, an order of performing the leak tests sequentially may be based on opportunity. Performing the leak tests based on opportunity includes performing the positive pressure leak test opportunistically during electrically-driven vacuum pump operation while performing the negative pressure leak test opportunistically during naturally aspirated engine conditions or after the vacuum pump has provided vacuum for the vacuum consumption device. For example, sequentially applying each of a positive pressure and a negative pressure generated at the vacuum pump on the fuel system may include during a first condition, where the vacuum pump is operating to provide vacuum to a vacuum consumption device when leak detection conditions are met, applying positive pressure on the fuel tank via the canister (by routing air exhausted from the pump on to the fuel system) before applying negative pressure on the fuel tank via the canister, and monitoring a rate of change in fuel tank pressure following application of the positive or negative pressure. Then, during a second condition, where the vacuum pump is almost done supplying vacuum to the vacuum consumption device when leak detection conditions are met, the sequentially applying includes applying negative pressure on the fuel tank via the canister (by routing vacuum from the pump on to the fuel system) before applying positive pressure on the fuel tank via the canister, and monitoring a rate of change in fuel tank pressure following application of the positive or negative pressure.

In this way, each of positive pressure and negative pressure generated at an electrically-driven vacuum pump may be sequentially applied on a fuel system, and fuel system degradation can be identified based on a rate of change in fuel system pressure following the application of the positive or negative pressure. By routing air exhausted from the vacuum pump during regular pump operation (e.g., for supplying vacuum to a vacuum-driven engine or vehicle actuator) to the fuel system, positive pressure generated at the pump may be opportunistically used for a positive pressure leak test. This enables a frequency of vacuum pump operation (solely) for the purpose of fuel system leak detection to be reduced. Then, during other conditions, the vacuum pump may be operated for enabling a negative pressure leak test.

Figure 3:
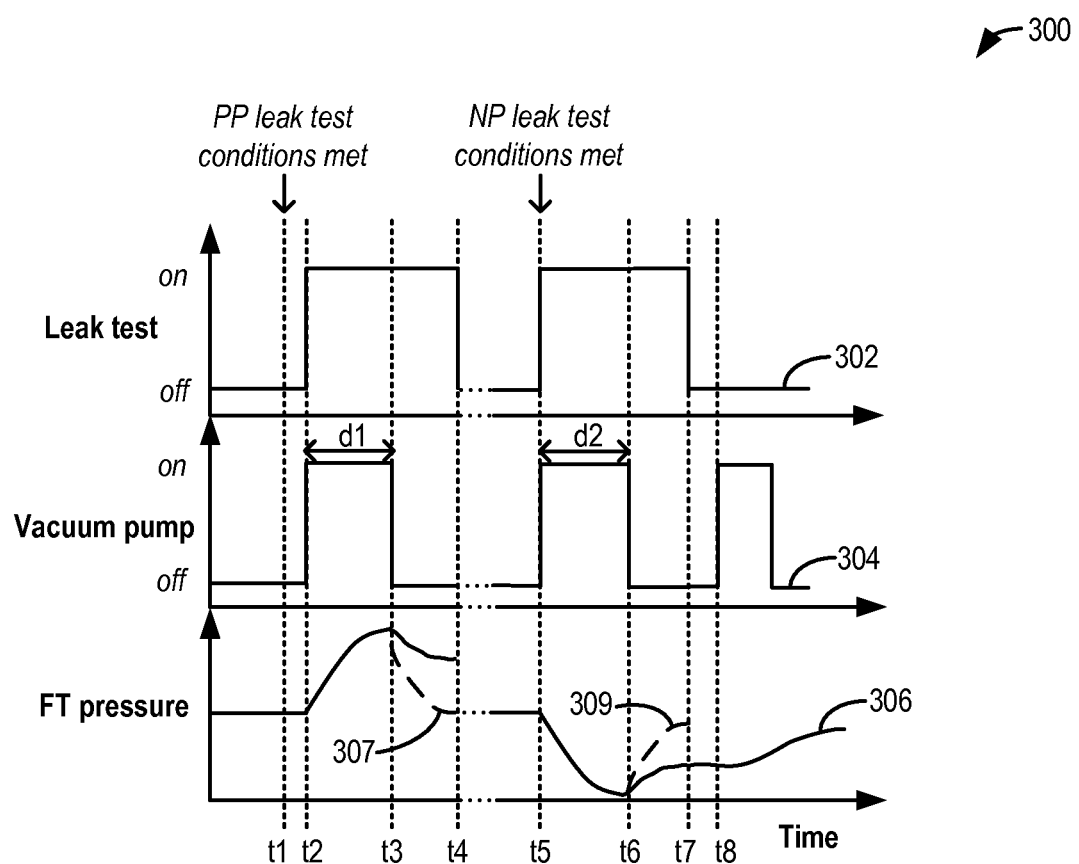
FIG. 3 shows example positive and negative pressure leak tests.

Now turning to FIG. 3, example positive pressure and negative pressure leak tests performed with the assistance of an existing system vacuum pump are shown at map 300. Specifically, an indication of when the leak test is running is provided at graph 302, vacuum pump operation is shown at graph 304, and changes in fuel tank (FT) pressure following application of positive pressure or negative pressure from the vacuum pump are shown at graph 306.

Before t1, the vehicle may be running in a battery mode with the vehicle being propelled with energy from an energy storage device, such as a battery. At t1, positive pressure (PP) leak test conditions may be met, however a positive pressure leak test may not be initiated until an opportunity for positive pressure generation and application arises. At t2, an electrically driven vacuum pump (graph 304) may be actuated so as to supply vacuum to a vacuum consumption device. For example, in response to vehicle brakes being activated at t2, the vacuum pump may be actuated so as to supply vacuum to a vacuum-actuated brake booster. Accordingly, at t2, the positive pressure leak test may be opportunistically initiated. In particular, while the vacuum pump is operated (for a duration d1) to supply vacuum to the vacuum consumption device, air exhausted from the vacuum pump is applied on the fuel tank via the canister to pressurize the fuel system.

As positive pressure from the vacuum pump is applied on the fuel tank, a fuel tank pressure may gradually increase (plot 306). Positive pressure is applied from the vacuum pump on the fuel tank for duration d1 (from t2 to t3) until a threshold pressure is reached. Then, after t3, application of positive pressure is discontinued (for example, by sealing the fuel system from the vacuum pump) and a rate of change in fuel system pressure is monitored to determine if there is fuel system degradation. Between t3 and t4, a change in fuel tank pressure following the application of the positive pressure is monitored. In the depicted example, a rate of bleed-down of fuel tank pressure (towards atmospheric pressure) is monitored. In the absence of a leak, the fuel tank pressure may bleed down at a slower rate (e.g., slower than a threshold rate), and stabilize at a higher pressure value (e.g., at or above a reference value), as shown by graph 306 (solid line). However, in the presence of a leak, the pressure may bleed down at a faster rate (e.g., faster than a threshold rate), and stabilize at a lower pressure value (e.g., below a reference value), as shown by graph 307 (dashed line). In response to a leak being detected, fuel system degradation is indicated by setting a diagnostic code.

At a later time during the battery mode of vehicle operation, specifically at t5, negative pressure (NP) leak test conditions may be met. Accordingly, at t5, the electrically driven vacuum pump (graph 304) may be actuated so as to apply a vacuum on the fuel system. In particular, the vacuum pump is operated for a duration d2 to apply vacuum on the fuel tank via the canister to pressurize the fuel system.

As negative pressure from the vacuum pump is applied on the fuel tank, a fuel tank pressure may gradually decrease (plot 306). That is, a fuel tank vacuum level (or negative pressure) may increase. Negative pressure is applied from the vacuum pump on the fuel tank for duration d2 (from t5 to t6) until a threshold pressure is reached. Then, after duration d2, application of negative pressure is discontinued (for example, by sealing the fuel system from the vacuum pump) and a rate of change in fuel system pressure is monitored to determine if there is fuel system degradation. Between t6 and t7, a change in the fuel tank/vacuum following the application of the negative pressure is monitored. In the depicted example, a rate of bleed-up of fuel tank pressure (towards atmospheric pressure) is monitored. In the absence of a leak, the fuel tank pressure may bleed up at a slower rate (e.g., slower than a threshold rate), and stabilize at a lower pressure value (e.g., at or below a reference value), as shown by graph 306 (solid line). However, in the presence of a leak, the pressure may bleed up at a faster rate (e.g., faster than a threshold rate), and stabilize at a higher pressure value (e.g., above a reference value), as shown by graph 309 (dashed line). In response to a leak being detected, fuel system degradation is indicated by setting a diagnostic code.

At t8, as at t2, the electrically driven vacuum pump (graph 304) may be actuated again so as to supply vacuum to the vacuum consumption device. For example, in response to vehicle brakes being activated at t8, the vacuum pump may be actuated so as to supply vacuum to a vacuum-actuated brake booster. However, since positive pressure leak conditions have been performed earlier, the vacuum pump is operated to only supply vacuum to the vacuum consumption device, and air exhausted from the vacuum pump is not applied on the fuel tank. That is, vacuum pump operation is not used to pressurize the fuel system for determining fuel system degradation.

In this way, during a first vehicle operating condition, positive pressure generated at an electrically-driven vacuum pump is applied on the fuel system while during a second vehicle operating condition, negative pressure generated at the electrically-driven vacuum pump is applied on the fuel system. During both the first and second conditions, fuel system degradation may be indicated in response to a change in fuel system pressure following application of the pressure. Specifically, during the second condition, while operating the vacuum pump, vacuum is routed from a first outlet of the pump to the fuel system to apply negative pressure on the fuel system while air is exhausted from a second, different outlet of the pump and routed to an intake manifold. In comparison, during the first condition, positive pressure generated at the electrically-driven vacuum pump is applied on the fuel system by operating the vacuum pump to route vacuum from the first outlet of the vacuum pump to a vacuum consumption device while routing air exhausted from the second, different outlet of the pump to the fuel system.

During both conditions, fuel system degradation is indicated in response to a change in fuel system pressure following application of the positive or negative pressure (e.g., an absolute rate of change in the fuel system pressure) being higher than a threshold rate. Further, an orifice size of the leak may be determined based on a difference between the absolute rate of change in the fuel system pressure and the threshold rate. For example, as the difference increases, a larger leak (that is, of a larger orifice size) may be determined. While the above examples depict the fuel system pressure as a fuel tank pressure estimated by a pressure sensor coupled between a fuel tank and a canister of the fuel system, in alternate embodiments, the pressure sensor may be located at an alternate location in the fuel system.

In this way, existing engine hardware can be used to opportunistically perform a fuel system leak test. Specifically, while a vacuum pump is operating to provide vacuum to an engine system vacuum consumption device, air exhausted from the vacuum pump can be opportunistically used to apply positive pressure on a fuel system to perform a positive pressure leak test. In addition, since fuel vapors do not pass through the pump, issues related to material incompatibility are reduced. During other times, when engine vacuum is not available, the same vacuum pump can also be used to apply negative pressure on the fuel system to perform a negative pressure leak test. As such, this not only reduces the need for a dedicated positive pressure pump and negative pressure pump, but also reduces the frequency at which the vacuum pump has to be operated for leak detection purposed. As such, this provides component and cost reduction benefits while also extending the operational life of the vacuum pump. By sequentially applying each of positive and negative pressure on a fuel tank, leaks masked by the application of positive pressure can be identified by the negative pressure leak test, while leaks masked by the application of negative pressure can be identified by the positive pressure leak test. By improving leak detection, exhaust emissions can be improved.

Note that the example control routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Further, one or more of the various system configurations may be used in combination with one or more of the described diagnostic routines. The subject matter of the present disclosure includes all novel and non-obvious combinations and sub-combinations of the various systems and configurations, and other features, functions, and/or properties disclosed herein.

The invention claimed is:
1. A hybrid vehicle system, comprising:
an engine including an intake manifold;
a fuel system including a fuel tank coupled to a canister, the canister coupled to the intake manifold via a canister purge valve;
a vacuum consumption device;
an electrically-driven vacuum pump including a first outlet for delivering vacuum and a second outlet for exhausting air, wherein the first outlet is selectively couplable to the vacuum consumption device or the fuel system, and wherein the second outlet is selectively couplable to the fuel system or the intake manifold;
a pressure sensor coupled to the fuel system for estimating a fuel system pressure; and
a controller with computer readable instructions for,
routing vacuum from the first outlet of the vacuum pump to the vacuum consumption device while exhausting air from the second outlet of the vacuum pump to the canister to apply a positive pressure on the fuel system, including opening the canister purge valve and closing each of a first solenoid valve coupled between the first outlet and the fuel system and a second solenoid valve coupled between the second outlet and the intake manifold, and indicating a fuel system leak based on a rate of pressure decay from the fuel system following the application of positive pressure, and
routing vacuum from the first outlet of the pump to the canister while exhausting air from the second outlet to the intake manifold to apply a negative pressure on the fuel system, including closing the canister purge valve and opening each of the first solenoid valve coupled between the first outlet and the fuel system and the second solenoid valve coupled between the second outlet and the intake manifold, and indicating a fuel system leak based on a rate of vacuum decay from the fuel system following the application of negative pressure.
2. The system of claim 1, wherein the fuel system pressure is a fuel tank pressure, and wherein the pressure sensor is coupled between the fuel tank and the canister.

* * * * *